United States Patent
Zhou et al.

(10) Patent No.: US 10,745,258 B2
(45) Date of Patent: Aug. 18, 2020

(54) BLADDER ASSEMBLY FOR A CLOSED HYDRAULIC POWER SYSTEM

(71) Applicant: Hangzhou Tianheng Machinery Company Ltd., Hangzhou (CN)

(72) Inventors: Haoliang Zhou, Hangzhou (CN); Zhengwei Gong, Hangzhou (CN)

(73) Assignee: HANGZHOU TIANHENG MACHINERY CO., LTD., Hangzhou (CN)

( * ) Notice: Subject to any disclaimer, the term of this patent is extended or adjusted under 35 U.S.C. 154(b) by 45 days.

(21) Appl. No.: 15/729,872

(22) Filed: Oct. 11, 2017

(65) Prior Publication Data

US 2018/0179036 A1   Jun. 28, 2018

(30) Foreign Application Priority Data

Dec. 22, 2016   (CN) .......................... 2016 1 1197187

(51) Int. Cl.
| | |
|---|---|
| *F15B 15/18* | (2006.01) |
| *B66F 3/42* | (2006.01) |
| *F15B 1/26* | (2006.01) |
| *F15B 15/14* | (2006.01) |

(52) U.S. Cl.
CPC .............. *B66F 3/42* (2013.01); *F15B 1/26* (2013.01); *F15B 15/18* (2013.01); *F15B 15/14* (2013.01); *F15B 15/1428* (2013.01)

(58) Field of Classification Search
CPC .. F15B 1/26; F15B 1/265; F15B 15/18; B66F 3/42; B66F 5/04
See application file for complete search history.

(56) References Cited

U.S. PATENT DOCUMENTS

| | | | | |
|---|---|---|---|---|
| 3,823,758 | A | * | 7/1974 | Heese ................... B63B 19/197 160/188 |
| 6,318,401 | B1 | * | 11/2001 | Cheng ....................... B66F 5/04 137/197 |
| 6,347,786 | B1 | | 2/2002 | Lai |
| 6,622,485 | B2 | | 9/2003 | Hung |
| 6,789,785 | B2 | | 9/2004 | Hung |
| 7,194,857 | B2 | | 3/2007 | Hung |

\* cited by examiner

*Primary Examiner* — Abiy Teka
(74) *Attorney, Agent, or Firm* — Kutak Rock LLP; Neil L. Arney; Brian L. Main

(57) ABSTRACT

An adjustable bladder assembly for use with a closed hydraulic power system is provided. The bladder assembly includes a rigid body and a bladder cover slidably engaged therein. The bladder cover divides an interior area of the bladder assembly into first and second portions. The first portion of the bladder assembly is configured to be in fluid communication with a fluid reservoir of the hydraulic power system, with internal pressure of the hydraulic power system acting on an inner surface of the bladder cover, thereby biasing the bladder assembly towards an inflated configuration. The second portion of the bladder assembly is open to the environment such that ambient air pressure acting on an outer surface of the bladder cover biases the bladder assembly towards a deflated configuration.

7 Claims, 5 Drawing Sheets

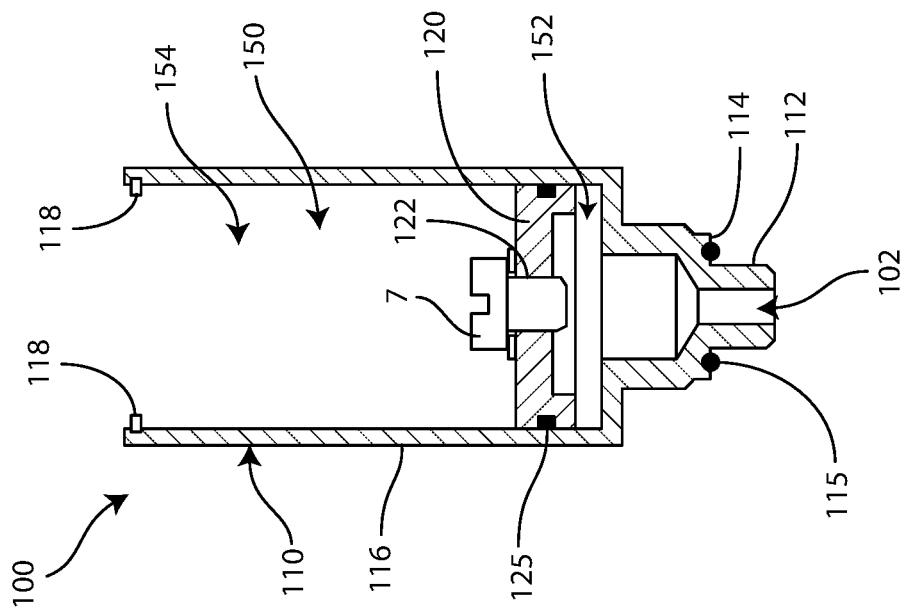
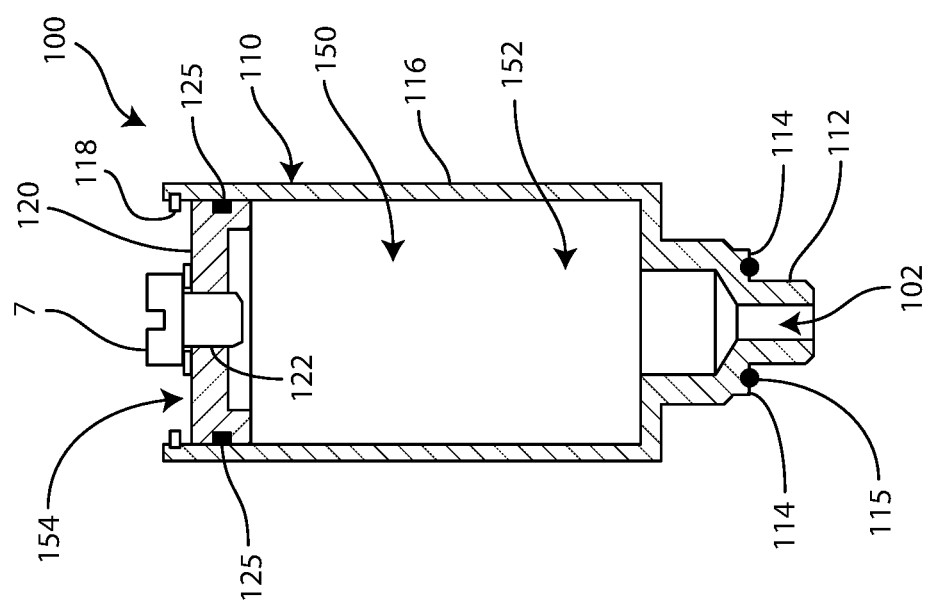
Fig. 5
Fig. 6

US 10,745,258 B2

BLADDER ASSEMBLY FOR A CLOSED HYDRAULIC POWER SYSTEM

CROSS-REFERENCE TO RELATED APPLICATIONS

This application claims priority to co-pending Chinese Patent Application No. 201611197187.4, filed Dec. 22, 2016, the entire disclosure of which is incorporated herein by reference.

FIELD OF THE INVENTION

The present invention relates generally to load lifting devices. More specifically, the present invention is concerned with a power system of a hydraulic jack and methods powering a hydraulic jack.

BACKGROUND

Traditional hydraulic jacks include a main cylinder, a ram extending from a distal end of the main cylinder, and a pump for driving fluid into a first chamber of the main cylinder, thereby moving the ram from a retracted configuration towards a deployed configuration. In this way, hydraulic jacks are capable of lifting and supporting heavy items. When the jack is no longer required, fluid can be drained from the first chamber of the main cylinder, thereby causing the ram to move towards its retracted configuration.

FIG. 1 shows a cross-section of a portion of a conventional floor jack having a main cylinder 30 positioned within an outer casing 20, thereby defining a reservoir 25 there between. A ram 50 extending into the main chamber 30 includes a piston 52 for dividing an interior area of the main cylinder into first 32 and second 34 chambers. The first chamber 32 extends from the piston to a proximal end of the main cylinder and the second chamber 34 extends from the piston 52 to a distal end of the main cylinder. A shaft 54 of the ram 50 extends from the piston 52 through the second chamber 34 and out the distal end of the main cylinder 30.

A pump 12 is configured to draw fluid from the reservoir 25 and drive the fluid into the first chamber, thereby causing the piston 52 to move away from the proximal end of the main cylinder 30 such that the volume of the first chamber 32 increases as the volume of the second chamber 34 decreases. As the piston moves, fluid from the second chamber 34 travels through a return channel 24 and into the reservoir 25. Because the shaft 54 extends through the second chamber 34, the volume of fluid added to the reservoir 25 is less than the volume of fluid extracted from the reservoir, thereby decreasing pressure within the reservoir 25 and decreasing the efficiency of the pump 12. Consequently, it would be beneficial to have a system for and a method of operating a hydraulic piston while eliminating pressure changes within the reservoir 25.

U.S. Pat. No. 6,318,401 (the '401 patent) and U.S. Pat. No. 7,194,857 (the '857 patent), the entire disclosures of which are incorporated herein by reference, teach ventilation systems that can be utilized to eliminate or further minimize pressure differentials within a reservoir. Specifically, the '401 patent and the '857 patent teach ventilation systems that are configured to engage with a fill hole 22 of the jack, thereby converting the jack from a closed system to an open system.

The outer casing 20 defines a fill hole 22 in fluid communication with the reservoir 25 so as to allow a user to add oil or other fluids to the reservoir 25. A plug 7 is selectively engaged with the fill hole 22, thereby creating a closed system. In this way, fluid is prevented from escaping the reservoir 25 and debris and moisture are prevented from entering the reservoir 25. By replacing the plug 7 with a ventilation system, as taught by the '401 patent and the '857 patent, fluid is no longer prevented from escaping the reservoir 25. In fact, for the ventilation system to work, air within the system must be able to escape from the reservoir 25 into the environment. Unfortunately, oil from within the reservoir 25 can also escape, especially if the jack is stored upside down or on its side. Furthermore, for the ventilation systems taught by the '401 patent and the '857 patent to work, air from the environment must be able to flow into the reservoir 25. Such air from the environment could include debris and/or moisture. Consequently, it would be beneficial to have a system for and a method of eliminating pressure changes within the reservoir 25 while maintaining a closed system.

SUMMARY

The present invention comprises a system for and a method of eliminating or otherwise minimizing pressure changes within a fluid reservoir of a closed hydraulic power system for a hydraulic jack. The system includes a bladder assembly having a first portion that is expandable and contractible. The first portion of the bladder assembly is configured to be in fluid communication with the fluid reservoir so as to selectively receive fluid from and/or supply fluid to the fluid reservoir.

In some embodiments, the bladder assembly includes a rigid body defining an interior area and a bladder cover slidably engaged therein. The bladder cover separates the first portion of the bladder assembly from a second portion of the bladder assembly, with the second portion being open to the environment. In this way, internal pressure acting on an inner surface of the bladder cover is opposed by ambient air pressure acting on an outer surface of the bladder cover, thereby creating a constant pressure-regulating mechanism that is configured to automatically adjust the volume of the first portion of the bladder assembly.

In some embodiments, the bladder assembly is configured to engage with a fill hole of a hydraulic jack, thereby allowing a hydraulic jack to be quickly and easily converted into a jack of the present invention.

The foregoing and other objects are intended to be illustrative of the invention and are not meant in a limiting sense. Many possible embodiments of the invention may be made and will be readily evident upon a study of the following specification and accompanying drawings comprising a part thereof. Various features and subcombinations of invention may be employed without reference to other features and subcombinations. Other objects and advantages of this invention will become apparent from the following description taken in connection with the accompanying drawings, wherein is set forth by way of illustration and example, an embodiment of this invention and various features thereof.

BRIEF DESCRIPTION

A preferred embodiment of the invention, illustrative of the best mode in which the applicant has contemplated applying the principles, is set forth in the following description and is shown in the drawings and is particularly and distinctly pointed out and set forth in the appended claims.

FIG. 5 is a cross-sectional view of a bladder assembly of the present invention, the bladder assembly shown in an inflated configuration.

FIG. 6 is a cross-sectional view of a bladder assembly of the present invention, the bladder assembly shown in a deflated configuration.

DETAILED DESCRIPTION

As required, a detailed embodiment of the present invention is disclosed herein; however, it is to be understood that the disclosed embodiment is merely exemplary of the principles of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Figure 1:
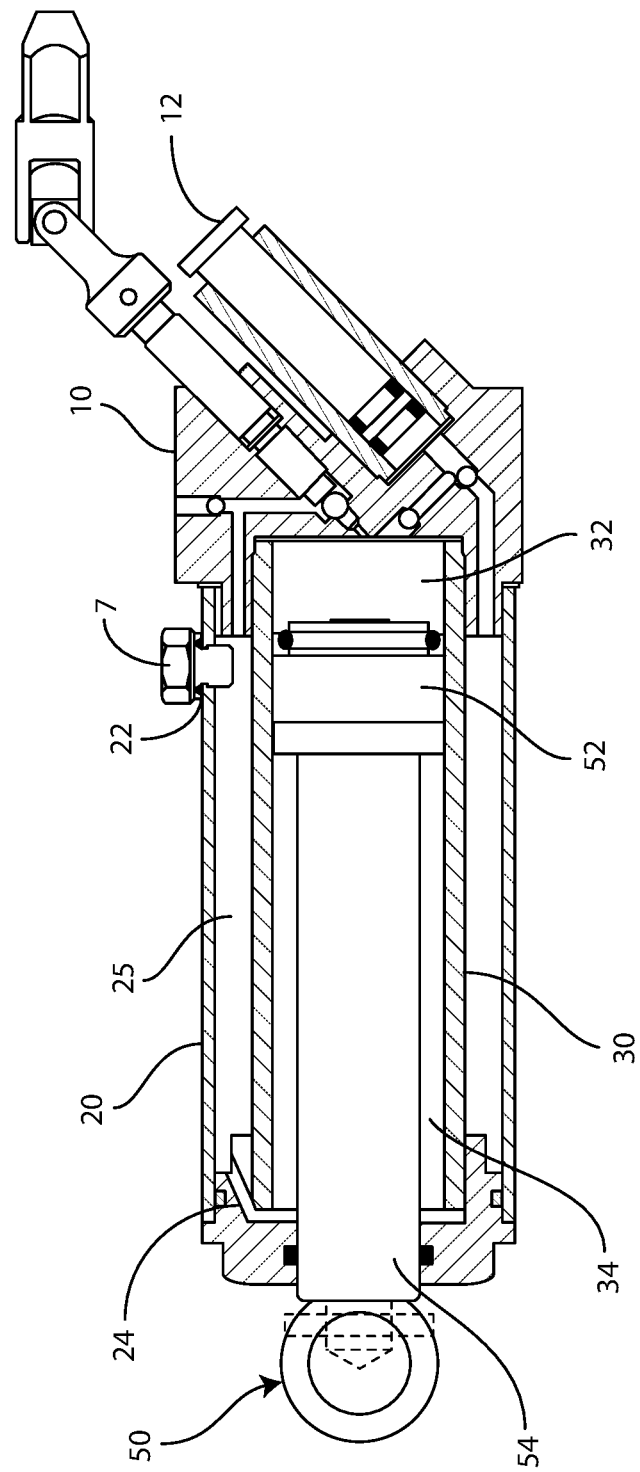
FIG. 1 is cross-sectional view of a conventional hydraulic power system for a conventional hydraulic jack, the system shown with a ram of the system in a retracted configuration.
Figure 2:
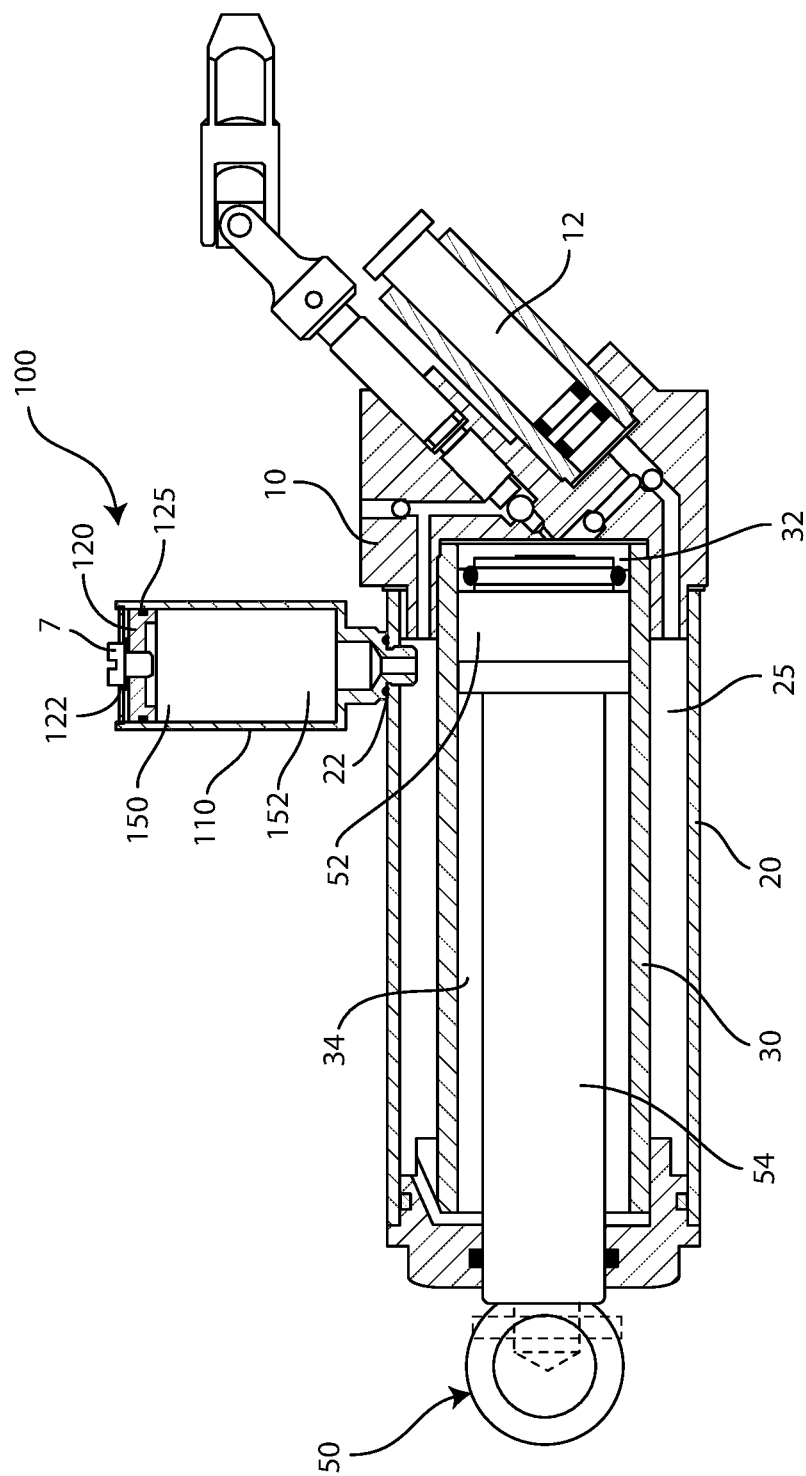
FIG. 2 is a cross-sectional view of a hydraulic power system of the present invention, the system shown with a ram of the system in a retracted configuration and a bladder assembly of the system shown in an inflated configuration.
Figure 3:
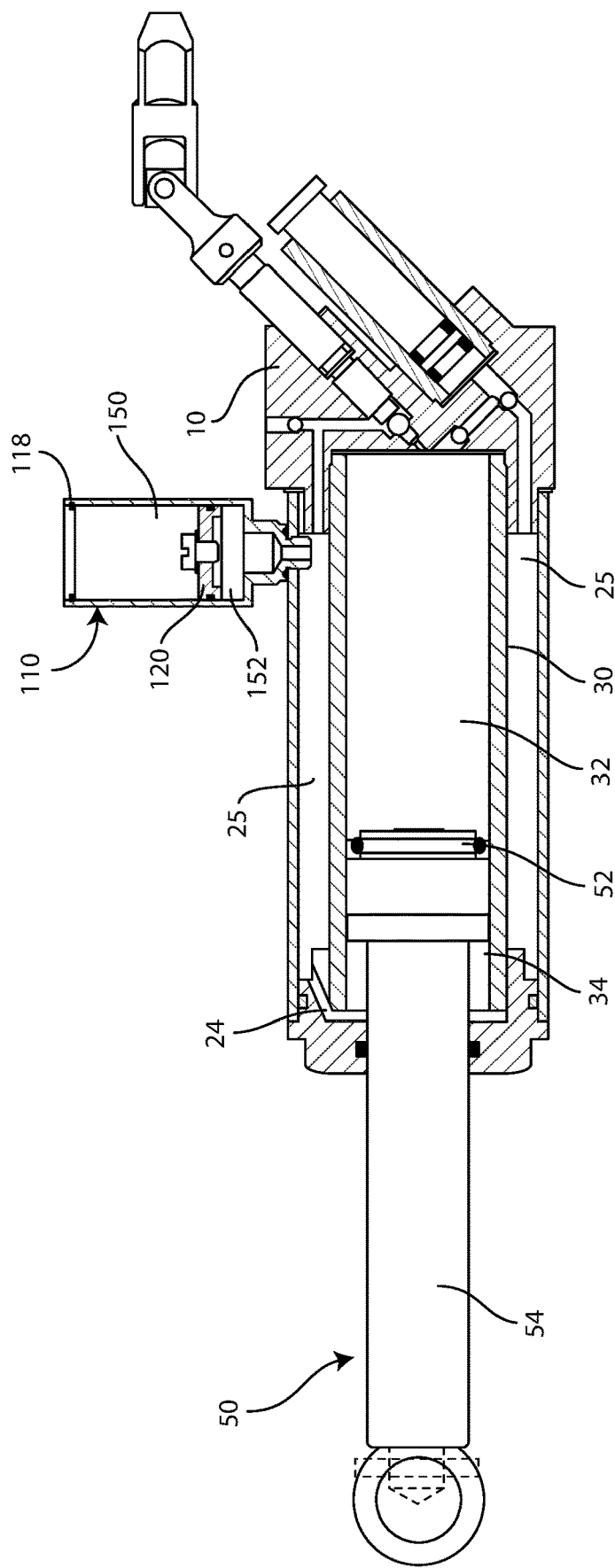
FIG. 3 is a cross-sectional view of a hydraulic power system of the present invention, the system shown with a ram of the system in a deployed configuration and a bladder assembly of the system shown in a deflated configuration.

Referring to FIGS. 2 through 6, a bladder assembly 100 of the present invention includes an interior area 150 having a first portion 152 in fluid communication with a jack or another device utilizing a hydraulic power system (each referred to herein as a "jack"). Referring to FIGS. 2 and 3, the bladder assembly 100 is moveable between an inflated configuration (FIG. 2) and a deflated configuration (FIG. 3). In the inflated configuration, the bladder assembly 100 is configured to hold a first volume of fluid within the first portion 152 of the interior area 150. In various embodiments, the volume of fluid comprises oil, air, and/or one or more other compressible or incompressible fluid. As the bladder assembly 100 is moved away from its inflated configuration, fluid is expelled from the first portion 152 of the interior area 150 until the bladder assembly 100 is in the deflated configuration. Alternatively, the bladder assembly 100 moves from its inflated configuration towards its deflated configuration as fluid is drawn from the first portion 152 of the bladder assembly 150. In some embodiments, the bladder assembly 100 is moved to its deflated configuration by expelling and/or withdrawing all or a substantial portion of the first volume of fluid.

A passageway 102 extends from the first portion 152 of the interior area 150 through which fluid is transferred between the bladder assembly 100 and the jack. In some embodiments, the first portion 152 of the interior area 150 of the bladder assembly 100 is airtight and water-tight (other than the passageway 102), thereby allowing the bladder assembly 100 to be utilized with the jack as part of a closed system. In other embodiments, the bladder assembly 100 includes one or more ventilation feature (such as those features taught by the '401 patent and/or the '857 patent), thereby creating an open system. In still other embodiments, the bladder assembly 100 is moveable between a closed configuration and an open configuration, thereby allowing a user to selectively open the system, such as to add fluid to the system.

In some embodiments, the bladder assembly 100 is configured to engage with the jack at or near a top end of the reservoir 25. In this way, the bladder assembly 100 is capable of extending vertically upward from the reservoir 25. In some such embodiments, the fluid within the first portion 152 of the interior area 150 of the bladder is comprised entirely or substantially entirely of air such that the bladder assembly 100 functions as an air bladder assembly.

In some embodiments, the passageway 102 is defined at least partially by a neck 112 extending from a bottom end of the bladder assembly 100. In some such embodiments, the neck is configured to selectively engaging with a fill hole 22 of the jack. In this way, the bladder assembly 100 can be retrofitted onto existing jacks simply by removing a plug 7 (or a ventilation system taught by the '401 patent or the '857 patent, as the case may be) and engaging the neck 112 of the bladder assembly 100 with the fill hole.

In some embodiments, the neck 112 extends from a rigid body 110 of the bladder assembly 100. In some such embodiments, the rigid body defines an exterior lip 114 extending radially outward from a proximal end of the neck 112. In this way, an exterior seal 115 can be positioned between a bottom surface of the exterior lip 114 and a top surface of the outer casing 20 of the jack so as to create an airtight and watertight seal. In some such embodiments, the exterior lip 114 and/or the outer casing 20 defines a groove for receiving at least part of the exterior seal 115, thereby concealing and/or protecting at least part of the exterior seal 115.

In some embodiments, the rigid body 110 includes a continuous wall 116 extending vertically away from the neck 112. An interior surface of the continuous wall 116 defines an outer boundary of the interior area 150 of the bladder assembly 100. In some embodiments, the continuous wall 116 is formed as a hollow cylindrical section of the bladder assembly 100.

In some embodiments, a bladder cover 120 positioned within the interior area 150 of the bladder assembly 100 is configured to engage with the inner surface of the continuous wall 116 so as to create an airtight and watertight seal. In some such embodiments, a circumferential edge of the bladder cover 120 defines a groove for receiving all or substantially all of an interior seal 125. In this way, the bladder cover 120 separates the first portion 152 of the interior area 150 from a second portion 154 of the interior area 150.

The bladder cover 120 is configured to slide along a length of the interior surface of the continuous wall 116 as the bladder assembly moves between its inflated and deflated configurations. Alternatively, sliding the bladder cover 120 along a length of the interior surface of the continuous wall 116 causes the bladder assembly to move between its inflated and deflated configurations. In some embodiments, the second portion 154 of the interior area 150 of the bladder assembly 100 is open to the environment. In this way, ambient air pressure acting on an outer surface of the bladder cover 120 biases the bladder assembly 100 towards the deflated configuration. Simultaneously, internal pressure within the reservoir 25 of the jack acting on an inner surface of the bladder cover 120 biases the bladder assembly towards the inflated configuration. In this way, the bladder assembly 100 is capable of automatically regulating the internal pressure of the jack.

In some embodiments, the rigid body 110 further includes an interior lip 118 extending radially inward from the inner surface of the continuous wall 116. The interior lip 118 is configured to prevent the bladder cover 120 from being ejected from the interior area 150 of the bladder assembly 100. In some such embodiments, the interior lip 118 defines a limit beyond which the bladder cover 120 is prevented from traveling. In some embodiments, the continuous wall defines a groove for receiving a portion of a retaining ring 118, thereby selectively retaining the bladder cover 120 within the interior area 150 of the bladder assembly 100. In some such embodiments, the retaining ring 118 is selectively removable, thereby enabling a user to remove the bladder cover 120 from the interior area 150 of the bladder assembly 100. In this way, a user is able to selectively move the bladder assembly from a closed configuration to an open configuration, thereby enabling the user to add fluid to and/or remove fluid from the jack.

In some embodiments, the bladder cover 120 defines a fill hole 122 extending between the first 152 and second 154 portions of the interior area 150 of the bladder assembly 100, thereby enabling a user to add fluid to the jack without requiring the user to remove the bladder assembly 100 from the jack. A plug 7 is configured to be selectively received by the fill hole 122 of the bladder cover 120 so as to create an airtight and watertight seal between the first 152 and second 154 portions of the interior area 150 of the bladder assembly. In some embodiments, the plug 7 for plugging the fill hole 122 of the bladder cover 120 is configured to selectively engage with the fill hole 22 of the jack, thereby allowing a user to quickly and easily convert the jack from a jack of the present invention to a conventional jack simply by removing the bladder assembly from the fill hole 22 of the jack, removing the plug 7 from the fill hole 122 of the bladder cover 120, and securing the plug 7 within the fill hole 22 of the jack. In this way, the user is not required to retain a separate plug and/or obtain a new plug to convert the jack back into a conventional jack.

Figure 4:
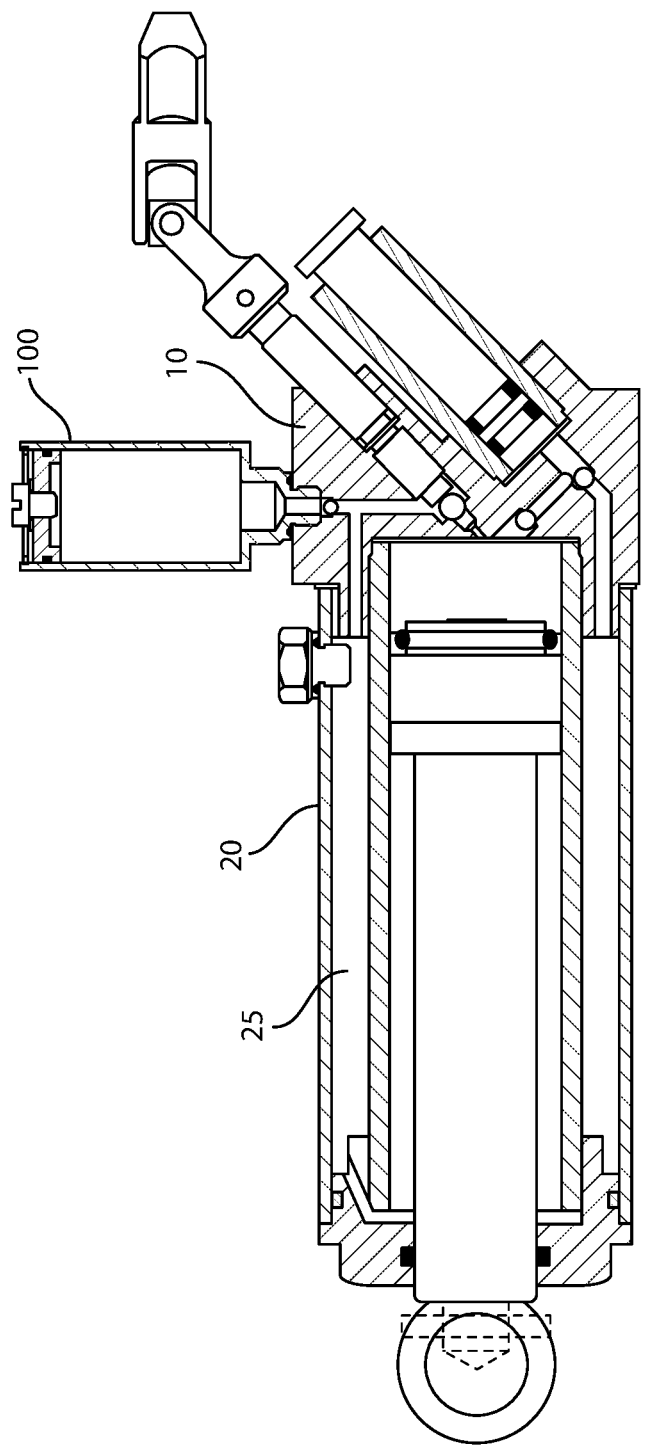
FIG. 4 is a cross-sectional view of a hydraulic power system of the present invention, the system shown with a bladder assembly secured to a base of the hydraulic power system.

Referring to FIG. 4, the bladder assembly 100 can be configured to install to the jack in a variety of locations and orientations. In some embodiments, the bladder assembly 100 is secured to a base 10 of the jack. In some such embodiments, internal channels cut through the base 10 interconnect the bladder assembly 100 with the fluid reservoir.

The present invention further includes a method of controlling pressure within a jack as a ram 50 of the jack is moved between retracted and deployed configurations. The method includes simultaneously moving a bladder assembly 100 between inflated and deflated configurations, thereby maintaining a substantially constant aggregate volume within a closed system of the jack.

In some embodiments, the bladder assembly 100 is configured to move towards its deflated configuration as the ram 50 moves towards its extended configuration. In some such embodiments, fluid within the bladder assembly 100 moves into a reservoir 25 of the jack to replenish at least some fluid lost to a first chamber 32 of the jack. In other such embodiments, fluid within the bladder assembly 100 moves into the first chamber 32 of the jack so as to reduce the amount of fluid withdrawn from the reservoir 25.

In some embodiments, the bladder assembly 100 is configured to move towards its inflated configuration as the ram 50 moves towards its retracted configuration. In some such embodiments, fluid within a reservoir 25 of the jack moves into the bladder assembly 100 so as to allow fluid to flow from a first chamber 32 of the jack into the reservoir without creating a high pressure environment. In other such embodiments, at least some fluid within a first chamber 32 of the jack moves into the bladder assembly 100, eliminating the need for such fluid to be moved into the reservoir 25 of the jack.

In some embodiments, the ram 50 includes a shaft 54 having an outside diameter that is approximately seventy percent (70%) of the outside diameter of the first 32 and second 34 chambers of the main cylinder 30. Consequently, the second chamber 34 defines a second cross-sectional area that is approximately fifty percent (50%) of a first cross-sectional area defined by the first chamber 32. In some such embodiments, the bladder assembly 100 is sized and configured to provide approximately fifty percent (50%) of the fluid necessary to move the ram 50 from its retracted configuration to its deployed configuration. Alternatively, the bladder assembly 100 is sized and configured to receive approximately fifty percent (50%) of the fluid expelled from a first chamber 32 of a main cylinder 30 of a jack as a ram 50 of the jack moves from its deployed configuration to its retracted configuration. In this way, the bladder assembly 100 is configured to minimize or even eliminate pressure changes within the fluid reservoir 25 as the ram moves between its deployed and retracted configurations. In other embodiments, the bladder assembly is sized and configured to provide less than fifty percent (50%) of the fluid necessary to move the ram 50 to its deployed configuration, thereby reducing but not eliminating pressure changes within the fluid reservoir 25. In still other embodiments, the ratio between the first cross sectional area and the second cross sectional area is more or less than fifty percent (50%) and the bladder assembly is sized and configured to eliminate or otherwise reduce pressure changes within the fluid reservoir 25.

In the foregoing description, certain terms have been used for brevity, clearness and understanding; but no unnecessary limitations are to be implied therefrom beyond the requirements of the prior art, because such terms are used for descriptive purposes and are intended to be broadly construed. Moreover, the description and illustration of the inventions is by way of example, and the scope of the inventions is not limited to the exact details shown or described.

Although the foregoing detailed description of the present invention has been described by reference to an exemplary embodiment, and the best mode contemplated for carrying out the present invention has been shown and described, it will be understood that certain changes, modification or variations may be made in embodying the above invention, and in the construction thereof, other than those specifically set forth herein, may be achieved by those skilled in the art without departing from the spirit and scope of the invention, and that such changes, modification or variations are to be considered as being within the overall scope of the present invention. Therefore, it is contemplated to cover the present invention and any and all changes, modifications, variations, or equivalents that fall with in the true spirit and scope of the underlying principles disclosed and claimed herein. Consequently, the scope of the present invention is intended to be limited only by the attached claims, all matter contained in the above description and shown in the accompanying drawings shall be interpreted as illustrative and not in a limiting sense.

Having now described the features, discoveries and principles of the invention, the manner in which the invention is constructed and used, the characteristics of the construction, and advantageous, new and useful results obtained; the new and useful structures, devices, elements, arrangements, parts and combinations, are set forth in the appended claims.

It is also to be understood that the following claims are intended to cover all of the generic and specific features of the invention herein described, and all statements of the scope of the invention which, as a matter of language, might be said to fall therebetween.

What is claimed is:

1. A hydraulic power system comprising:
a main cylinder having a first chamber extending from a proximal end of the main cylinder;
a ram slidably engaged with the main cylinder, the ram comprising a piston defining a distal end of the first chamber and a shaft extending from the piston out a distal end of the main cylinder;
a fluid reservoir for holding a volume of fluid;
a pump in fluid communication with the fluid reservoir; and
a bladder assembly in fluid communication with the reservoir,
wherein the pump is configured to draw fluid from the fluid reservoir and drive the fluid into the first chamber of the main cylinder, thereby causing the ram to move towards a deployed configuration, and
wherein the bladder assembly is configured to maintain pressure within the fluid reservoir by moving towards a deflated configuration while the ram is being moved towards its deployed configuration.

2. The hydraulic power system of claim 1, wherein a first portion of the bladder assembly is airtight and watertight except for a passageway extending into the fluid reservoir, through which the fluid reservoir and the bladder assembly are in fluid communication.

3. The hydraulic power system of claim 2, wherein a first volume defined by the first portion of the bladder assembly decreases incrementally as the ram moves incrementally towards its deployed configuration.

4. The hydraulic power system of claim 3, wherein the first volume increases incrementally as the ram moves incrementally away from its deployed configuration.

5. A method of maintaining atmospheric pressure within a closed hydraulic power system for a hydraulic jack, the method comprising:
securing a bladder assembly to the hydraulic lack so that a first portion of the bladder assembly will be in fluid communication with a fluid reservoir of the hydraulic power system;
drawing fluid from the fluid reservoir;
driving fluid into a first chamber of a main cylinder of the hydraulic power system, thereby causing a ram of the hydraulic lack to move towards a deployed configuration; and
decreasing incrementally a first volume as the ram moves incrementally towards its deployed configuration,
draining fluid from the first chamber of the main cylinder into the fluid reservoir in association with the ram of the hydraulic jack moving towards a stowed configuration;
increasing incrementally the first volume as the ram moves incrementally towards its stowed configuration, and
decreasing incrementally a second volume as the first volume is increased incrementally,
wherein the first volume is defined by the first portion of the bladder assembly, and
wherein the second volume is defined by the second portion of the bladder assembly.

6. The method of claim 5, wherein a bladder cover of the bladder assembly separates an interior area of the bladder assembly into the first portion and a second portion, and wherein internal pressures within the fluid reservoir of the hydraulic power system acting on an outer surface of the bladder cover biases the bladder assembly towards an inflated configuration, wherein the inflated configuration comprises the first and second volumes being at maximum and minimum values, respectively.

7. The method of claim 6, wherein the second portion of the bladder assembly is open to the environment such that ambient air pressure acting on an outer surface of the bladder cover biases the bladder assembly towards a deflated configuration, wherein the deflated configuration comprises the first and second volumes being at minimum and maximum values, respectively.

* * * * *